US010051440B2

(12) United States Patent
Åkesson et al.

(10) Patent No.: US 10,051,440 B2
(45) Date of Patent: Aug. 14, 2018

(54) MBMS BEARER HANDLING IN A GROUP COMMUNICATIONS SYSTEM (71) Applicant: TELEFONAKTIEBOLAGET LM ERICSSON (PUBL), Stockholm (SE)

(72) Inventors: Joakim Åkesson, Landvetter (SE); Magnus Tränk, Lerum (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 46 days.

(21) Appl. No.: 15/083,436

(22) Filed: Mar. 29, 2016

(65) Prior Publication Data

US 2017/0086034 A1  Mar. 23, 2017

Related U.S. Application Data (60) Provisional application No. 62/221,872, filed on Sep. 22, 2015.

(51) Int. Cl.
H04H 20/71 (2008.01)
H04W 4/08 (2009.01)
(Continued)

(52) U.S. Cl.
CPC .......... *H04W 4/08* (2013.01); *H04L 65/1069* (2013.01); *H04W 4/10* (2013.01); *H04W 4/06* (2013.01); *H04W 76/002* (2013.01)

(58) Field of Classification Search
None
See application file for complete search history.

(56) References Cited

U.S. PATENT DOCUMENTS 8,494,063 B1 * 7/2013 Reudink ............... H04L 1/0025
370/252
2002/0037735 A1 * 3/2002 Maggenti ............ H04L 63/0428
455/517
(Continued)

FOREIGN PATENT DOCUMENTS

CN   1852496 A   10/2006
CN   1859636 A   11/2006
(Continued)

OTHER PUBLICATIONS

Motorola Solutions: "Detail related to multicast for interfaces in section 7.5", 3GPP Draft; S6-150744 Detail Related to Multicast for Interfaces, 3rd Generation Partnership Project (3GPP), Mobile Competence Centre ; 650, Route Des Lucioles ; F-06921 Sophia-Antipolis Cedex, France. vol. SA WG6, No. Seoul, Korea; Jul. 6, 2015-Jul. 10, 2015. Jul. 10, 2015. (Jul. 10, 2015).
(Continued)

Primary Examiner — Rebecca E Song (57) ABSTRACT

In accordance with particular embodiments, a method, performed by a control node for multimedia broadcast multicast service (MBMS) bearer handling comprises activating and announcing a first MBMS bearer for supporting floor control in a group call to client nodes of the group call. The method additionally includes activating and announcing at least one second MBMS bearer for supporting media transmission in the group call. The floor control and the media transmission are supported on separate MBMS bearers. In accordance with certain embodiments, a method, performed by a client node for MBMS bearer handling comprises obtaining a broadcast service announcement of a first MBMS bearer for supporting floor control in a group call. The method additionally includes obtaining a broadcast service announcement of at least one second MBMS bearer for supporting
(Continued)

media transmission in the group call. The floor control and the media transmission are supported on separate MBMS bearers.

20 Claims, 6 Drawing Sheets

(51) Int. Cl.
  *H04L 29/06* (2006.01)
  *H04W 4/10* (2009.01)
  *H04W 4/06* (2009.01)
  *H04W 76/00* (2018.01)

(56) References Cited

U.S. PATENT DOCUMENTS

| | | | |
|---|---|---|---|
| 2009/0055473 A1* | 2/2009 | Synnergren | H04L 29/06027 709/204 |
| 2012/0170501 A1* | 7/2012 | Drozt | H04W 72/005 370/312 |
| 2012/0170502 A1* | 7/2012 | Korus | H04W 4/06 370/312 |
| 2013/0315164 A1 | 11/2013 | Arur et al. | |
| 2014/0286222 A1* | 9/2014 | Yu | H04W 4/08 370/312 |
| 2015/0229677 A1 | 8/2015 | Gu et al. | |

FOREIGN PATENT DOCUMENTS

| | | |
|---|---|---|
| CN | 1897720 A | 1/2007 |
| CN | 101159928 A | 4/2008 |
| CN | 103141124 A | 6/2013 |
| WO | 2012092097 A2 | 7/2012 |
| WO | 2015014317 A1 | 2/2015 |

OTHER PUBLICATIONS

3rd Generation Partnership Project; Technical Specification Group Services and System Aspects; Functional architecture and information flows to support mission critical communication services; Stage 2 (Release 13). 3GPP TS 23.179 V0.3.0 (Aug. 2015).

3rd Generation Partnership Project; Technical Specification Group Services and System Aspects; Multimedia Broadcast/Multicast Service (MBMS); Architecture and functional description (Release 13) 3GPP TS 23.246 V13.1.0 (Jun. 2015).

3rd Generation Partnership Project; Technical Specification Group Core Network and Terminals; Group Communication System Enablers for LTE (GCSE_LTE); MB2 Reference Point; Stage 3 (Release 12). 3GPP TS 29.468 V12.3.0 (Jun. 2015).

3rd Generation Partnership Project; Technical Specification Group Services and System Aspects; Group Communication System Enablers for LTE (GCSE_LTE); Stage 2 (Release 13). 3GPP TS 23.468 V13.3.0 (Dec. 2015).

* cited by examiner

MBMS BEARER HANDLING IN A GROUP COMMUNICATIONS SYSTEM

TECHNICAL FIELD

Embodiments presented herein relate to a control node, a client node, computer programs, and a computer program product for multimedia broadcast multicast service (MBMS) bearer handling in a group communications system.

BACKGROUND

In communications systems, there may be a challenge to obtain good performance and capacity for a given communications protocol, its parameters and the physical environment in which the communications system is deployed.

For example, one example of applications available in some communications system is group communications services. In general terms, group communication requires that the same information is delivered to multiple clients. These clients may be located at different locations. If many clients are located within the same area, multicast or broadcast based transmission using e.g. Multicast-Broadcast Multimedia Services (MBMS) is efficient.

In group communication systems (e.g. Push-To-Talk (PTT) systems) a floor control function is essential. The floor control function gives the clients the ability to request certain capacity of shared resources used to transmit media to other clients in the group communication system. In order to efficiently use a floor control function there is a need for a floor arbitrator, which at every moment decides which client is allowed to transmit media. The floor control process starts with a client that wish to transmit media sends a floor request message to the floor arbitrator. If there are available resources the floor arbitrator grants the client the right to transmit by the floor arbitrator sending a floor grant message to that client. The floor arbitrator also sends a floor taken message to all clients that have announced interest in participating, and thus exchanging media, in the specific communication group.

In current group communications system being served on cellular communications systems the floor control signaling is typically transmitted together with the media on a specific media bearer. This means that the floor control signaling and the media are transmitted with the same quality of service (QoS). The floor control signaling is sensitive for packet loss. A lost floor control signal can result in that a client does not know when to start to transmit media or that a receiving client does not know who is currently granted the right to transmit media. Correct delivery of the floor control message may thus be regarded as critical. Typically the target is to keep packet loss below $10^{-6}$ for control signaling. On the other hand, occasional lost media (e.g. voice) packets will hardly be noticed by the receiving clients. The delivery of the media packets may accept a certain level of packet loss; typically the target is to keep packet loss below $10^{-2}$.

When using MBMS to broadcast media in a group communications system, the transmitting client use unicast to transmit the media to the group communications system, and a control node in the group communications system use broadcast to send the media to all receiving clients. There is no uplink bearer available to report lost packets and request retransmissions for the receiving clients. Due to this the modulation and coding of the media transmission (including the floor control signaling) over the air must be robust enough to achieve acceptable QoS. Hence, it is the floor control signaling that sets the requirements on the modulation and coding of the transmission.

In view of the above, the QoS requirements are different for control signaling and media. The encoding of the media and floor control signaling is chosen based on the QoS requirements on floor control signaling, which means that the media is transmitted with a more robust encoding than needed. This leads to inefficient use of MBMS resources as well as radio resources. Another issue is that the clients may need to listen to quite a large MBMS bearer, or several bearers, to capture media from all groups it is affiliated to. This is battery consuming.

Hence, there is still a need for an improved utilization of available network resources for efficient group communications.

SUMMARY

An object of embodiments herein is to provide efficient utilization of available network resources for efficient group communications.

According to a first aspect there is presented a method for multimedia broadcast multicast service (MBMS) bearer handling in a group communications system. The method is performed by a control node. The method comprises activating and announcing a first MBMS bearer for supporting floor control in a group call to client nodes of the group call. The method comprises activating and announcing at least one second MBMS bearer for supporting media transmission in the group call. The floor control and the media transmission are thereby supported on separate MBMS bearers for the group call.

Advantageously this provides efficient use of MBMS resources as well as radio resources, thereby enabling efficient group communications.

Advantageously, this enables the floor control signaling to be independent of the media signaling. This enables clients to only monitor the floor control signaling and based on this signaling make a decision whether or not to receive the media.

According to an embodiment the MBMS bearer for floor control will be using a more robust modulation and coding scheme than the MBMS bearer, or bearers, for media. This yields a higher QoS for the floor control signaling than for the media signalling. This leads to an even more efficient use of available radio resources.

According to a second aspect there is presented a control node for multimedia broadcast multicast service (MBMS) bearer handling in a group communications system. The control node comprises processing circuitry. The processing circuitry is configured to cause the control node to perform a set of operations. The processing circuitry is configured to cause the control node to activate and announce a first MBMS bearer for supporting floor control in a group call to client nodes of the group call. The processing circuitry is configured to cause the control node to activate and announce at least one second MBMS bearer for supporting media transmission in the group call. The floor control and the media transmission are thereby supported on separate MBMS bearers for the group call.

According to a third aspect there is presented a computer program for MBMS bearer handling in a group communications system, the computer program comprising computer program code which, when run on processing circuitry of a control node, causes the control node to perform a method according to the first aspect.

According to a fourth aspect there is presented a method for multimedia broadcast multicast service (MBMS) bearer handling in a group communications system. The method is performed by a client node. The method comprises obtaining a broadcast service announcement of a first MBMS bearer for supporting floor control in a group call from a control node (200) of the group call. The method comprises obtaining a broadcast service announcement of at least one second MBMS bearer for supporting media transmission in the group call from the control node. The floor control and the media transmission are thereby supported on separate MBMS bearers for the group call.

According to a fifth aspect there is presented a client node for multimedia broadcast multicast service (MBMS) bearer handling in a group communications system. The client node comprises processing circuitry. The processing circuitry being is to cause the client node to perform a set of operations. The processing circuitry is configured to cause the client node to obtain a broadcast service announcement of a first MBMS bearer for supporting floor control in a group call from a control node of the group call. The processing circuitry is configured to cause the client node to obtain a broadcast service announcement of at least one second MBMS bearer for supporting media transmission in the group call from the control node. The floor control and the media transmission are thereby supported on separate MBMS bearers for the group call.

According to a sixth aspect there is presented a computer program for MBMS bearer handling in a group communications system, the computer program comprising computer program code which, when run on processing circuitry of a client node, causes the processing circuitry to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in this disclosure are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The proposed solutions are now described, by way of example, with reference to the accompanying drawings, in which.

DETAILED DESCRIPTION

The proposed solutions will now be described more fully hereinafter with reference to the accompanying drawings, in which certain embodiments are shown. These proposed solutions may, however, be embodied in many different forms and should not be construed as limited to the embodiments set forth herein; rather, these embodiments are provided by way of example so that this disclosure will be thorough and complete, and will fully convey the scope of the proposed solutions to those skilled in the art. Like numbers refer to like elements throughout the description. Any step or feature illustrated by dashed lines should be regarded as optional.

Figure 1:
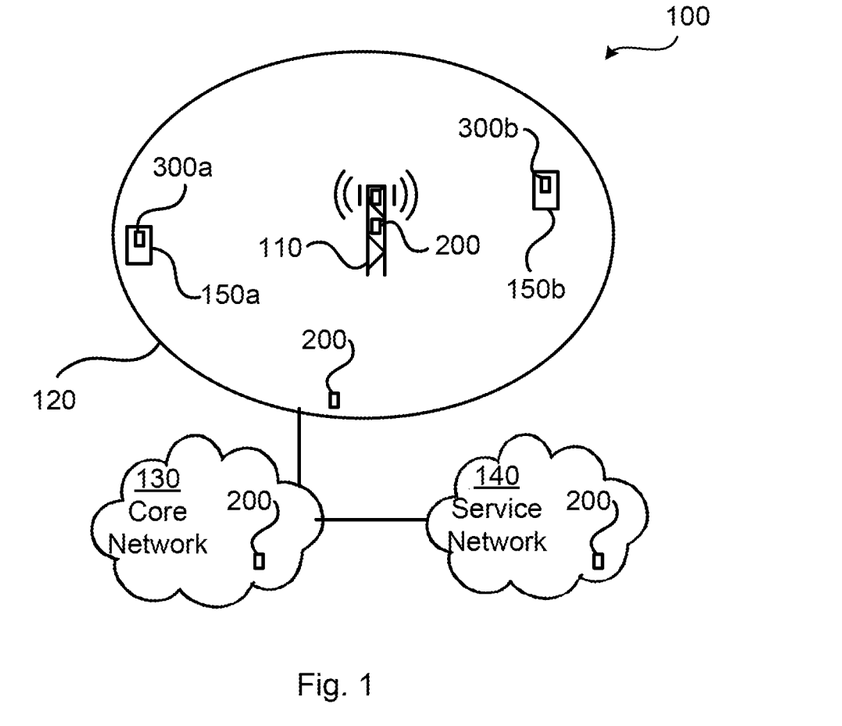
FIG. 1 is a schematic diagram illustrating a communications system according to embodiments.

FIG. 1 is a schematic diagram illustrating a communications system 100 where embodiments presented herein can be applied. The communications system 100 is assumed to provide services for group communication may hence be regarded as a group communications system. The group communications system 100 may be a push to talk (PTT) system.

The communications system 100 comprises at least one control node 200 and at least two client nodes 300a, 300b. The at least one control node 200 may be provided in, or installed on, a radio access network node 110 or in another entity or device in a radio access network 120, in an entity or device of a core network 130, or in an entity or device of a service network 140. Each client node may be provided in, or installed on, a respective wireless device 150a, 150b.

Examples of wireless devices 150a, 150b include, but are not limited to, mobile stations, mobile phones, handsets, wireless local loop phones, user equipment (UE), smartphones, laptop computers, and tablet computers. Examples of radio access network nodes 110 include, but are not limited to, radio base stations, base transceiver stations, node Bs, evolved node Bs, and access points. As the skilled person understands, the communications system 100 may comprise a plurality of radio access network nodes 110, each providing network access to a plurality of wireless devices 150a, 150b. The herein disclosed embodiments are no limited to any particular number of radio access network nodes 110 or wireless devices 150a, 150b. In this respect it is assumed that there is at least one control node 200 and at least two client nodes 300a, 300b.

The embodiments disclosed herein thus relate to mechanisms for MBMS bearer handling in a group communications system. In order to obtain such mechanisms there is provided a control node 200, a method performed by the control node 200, a computer program comprising code, for example in the form of a computer program product, that when run on processing circuitry of the control node 200, causes the control node 200 to perform the method. In order to obtain such mechanisms there is further provided a client node 300a, 300b, a method performed by the client node 300a, 300b, and a computer program comprising code, for example in the form of a computer program product, that when run on processing circuitry of the client node 300a, 300b, causes the client node 300a, 300b to perform the method.

Figure 2A:
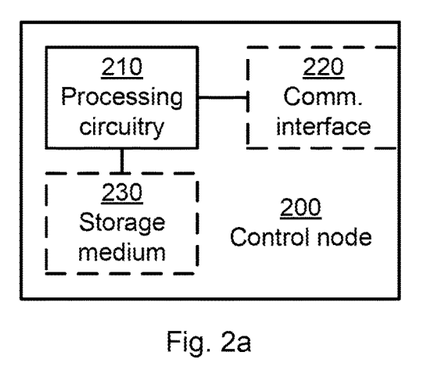
FIG. 2a is a schematic diagram showing functional units of a control node according to an embodiment.

FIG. 2a schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410a (as in FIG. 4), e.g. in the form of a storage medium 230.

Particularly, the processing circuitry 210 is configured to cause the control node 200 to perform a set of operations, or steps, S101-S109. These operations, or steps, S101-S109 will be disclosed below. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The control node 200 may further comprise a communications interface 220 for communications at least with client nodes 300a, 300b. As such the communications interface 220 may comprise one or more transmitters and receivers, comprising analogue and digital components and a suitable number of antennas for wireless communications and ports for wireline communications.

The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 2B:
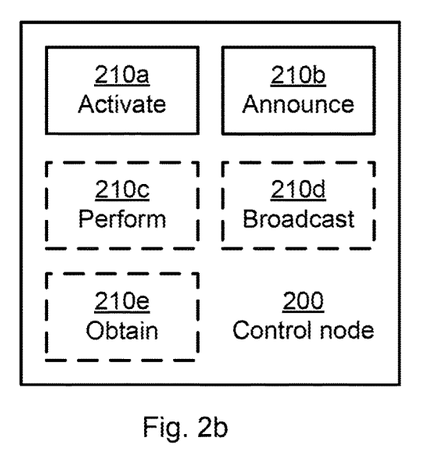
FIG. 2b is a schematic diagram showing functional modules of a control node according to an embodiment.

FIG. 2b schematically illustrates, in terms of a number of functional modules, 210a-210c the components of a control node 200 according to an embodiment. The control node 200 of FIG. 2b comprises a number of functional modules; an activate module 210a configured to perform below steps S101, S103, S303a, S303b, S304a, S304b, and an announce module 210b configured to perform below steps S101, S103, S303a, S303b, S304a, S304b. The control node 200 of FIG. 2b may further comprise a number of optional functional modules, such as any of a perform module 210c configured to perform below steps S100 S105b, S307, a broadcast module 210d configured to perform below steps S108, S110, S307, S308, and an obtain module 210e configured to perform below steps S105a, S106, S109, S302, S307, S108. The functionality of each functional module 210a-210e will be further disclosed below in the context of which the functional modules 210a-210e may be used. In general terms, each functional module 210a-210e may be implemented in hardware or in software. Preferably, one or more or all functional modules 210a-210e may be implemented by the processing circuitry 210, possibly in cooperation with functional units 220 and/or 230. The processing circuitry 210 may thus be arranged to from the storage medium 230 fetch instructions as provided by a functional module 210a-210e and to execute these instructions, thereby performing any steps as will be disclosed hereinafter.

The control node 200 may be provided as a standalone device or as a part of at least one further device. For example, the control node 200 may be provided in a node of the radio access network or in a node of the core network. Alternatively, functionality of the control node 200 may be distributed between at least two devices, or nodes. These at least two nodes, or devices, may either be part of the same network part (such as the radio access network or the core network) or may be spread between at least two such network parts. Some examples of where in the communications system 100 the control node 200 may be provided are illustrated in FIG. 1.

Functionality of the control node 200 may be implemented at the service layer of the protocol stack. In general terms, instructions that are required to be performed in real time may be performed in a device, or node, operatively closer to the radio access network than instructions that are not required to be performed in real time. In this respect, at least part of the control node 200 may reside in the radio access network, such as in the radio access network node, for cases when embodiments as disclosed herein are performed in real time.

Thus, a first portion of the instructions performed by the control node 200 may be executed in a first device, and a second portion of the of the instructions performed by the control node 200 may be executed in a second device; the herein disclosed embodiments are not limited to any particular number of devices on which the instructions performed by the control node 200 may be executed. Hence, the methods according to the herein disclosed embodiments are suitable to be performed by a control node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210c of FIG. 2b and the computer program 420a of FIG. 4 (see below).

Figure 3A:
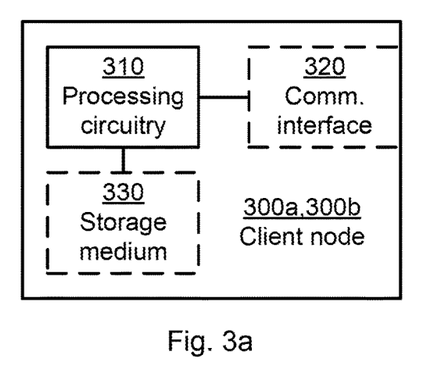
FIG. 3a is a schematic diagram showing functional units of a client node according to an embodiment.

FIG. 3a schematically illustrates, in terms of a number of functional units, the components of a client node 300a, 300b according to an embodiment. Processing circuitry 310 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 4), e.g. in the form of a storage medium 330.

Particularly, the processing circuitry 310 is configured to cause the client node 300a, 300b to perform a set of operations, or steps, S201-S209. These operations, or steps, S201-S209 will be disclosed below. For example, the storage medium 330 may store the set of operations, and the processing circuitry 310 may be configured to retrieve the set of operations from the storage medium 330 to cause the client node 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The client node 300a, 300b may further comprise a communications interface 320 for communications at least with the control node 200. As such the communications interface 320 may comprise one or more transmitters and receivers, comprising analogue and digital components and a suitable number of antennas for wireless communications and ports for wireline communications.

The processing circuitry 310 controls the general operation of the client node 300a, 300b e.g. by sending data and control signals to the communications interface 320 and the storage medium 330, by receiving data and reports from the communications interface 320, and by retrieving data and instructions from the storage medium 330. Other components, as well as the related functionality, of the client node 300a, 300b are omitted in order not to obscure the concepts presented herein.

Figure 3B:
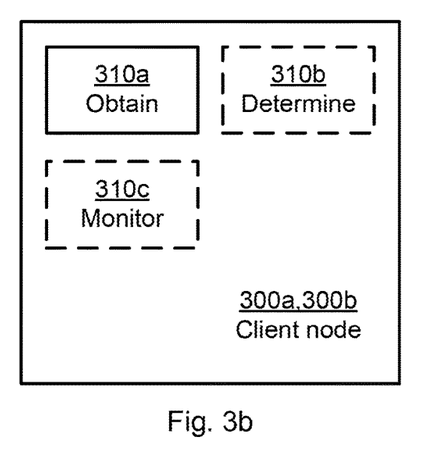
FIG. 3b is a schematic diagram showing functional modules of a client node according to an embodiment.

FIG. 3b schematically illustrates, in terms of a number of functional modules, the components of a client node 300a, 300b according to an embodiment. The client node 300a, 300b of FIG. 3b comprises an obtain module 310a configured to perform below steps S200, S201, S203, S205, S208, S210, S304a, S304b, S307, S308. The client node 300a, 300b of FIG. 3b may further comprises a number of optional functional modules, such as any of a determine module 310b configured to perform below steps S202a, S204a, and a monitor module 310c configured to perform below steps S202b, S204b, S305. The functionality of each functional module 310a-310c will be further disclosed below in the context of which the functional modules 310a-310c may be used. In general terms, each functional module 310a-310c may be implemented in hardware or in software. Preferably, one or more or all functional modules 310a-310c may be implemented by the processing circuitry 310, possibly in cooperation with functional units 320 and/or 330. The processing circuitry 310 may thus be arranged to from the storage medium 330 fetch instructions as provided by a functional 310a-310c and to execute these instructions, thereby performing any steps as will be disclosed hereinafter.

The client node 300a, 300b may be provided as a standalone device or as a part of at least one further device. For example, the client node 300a, 300b may be provided in a wireless device 150a, 150b. Hence, any processing circuitry, communications interface and storage medium of the wireless device 150a, 150b may be shared with the processing circuitry 310, communications interface 320 and storage medium 330 of the client node 300a, 300b. It is thus not necessary for the client node 300a, 300b to have its own processing circuitry 310, communications interface 320 and storage medium 330 as long as the processing circuitry, communications interface and storage medium of the wireless device 150a, 150b is configured to implement the functionality of the herein disclosed client node 300a, 300b.

Figure 4:
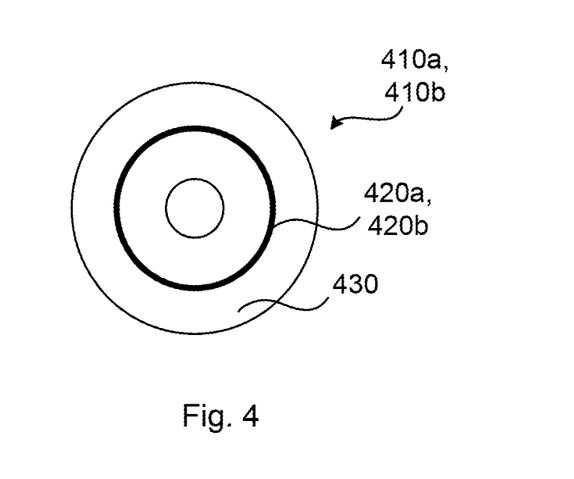
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the control node 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the client node 300a, 300b as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figures 5, 6:
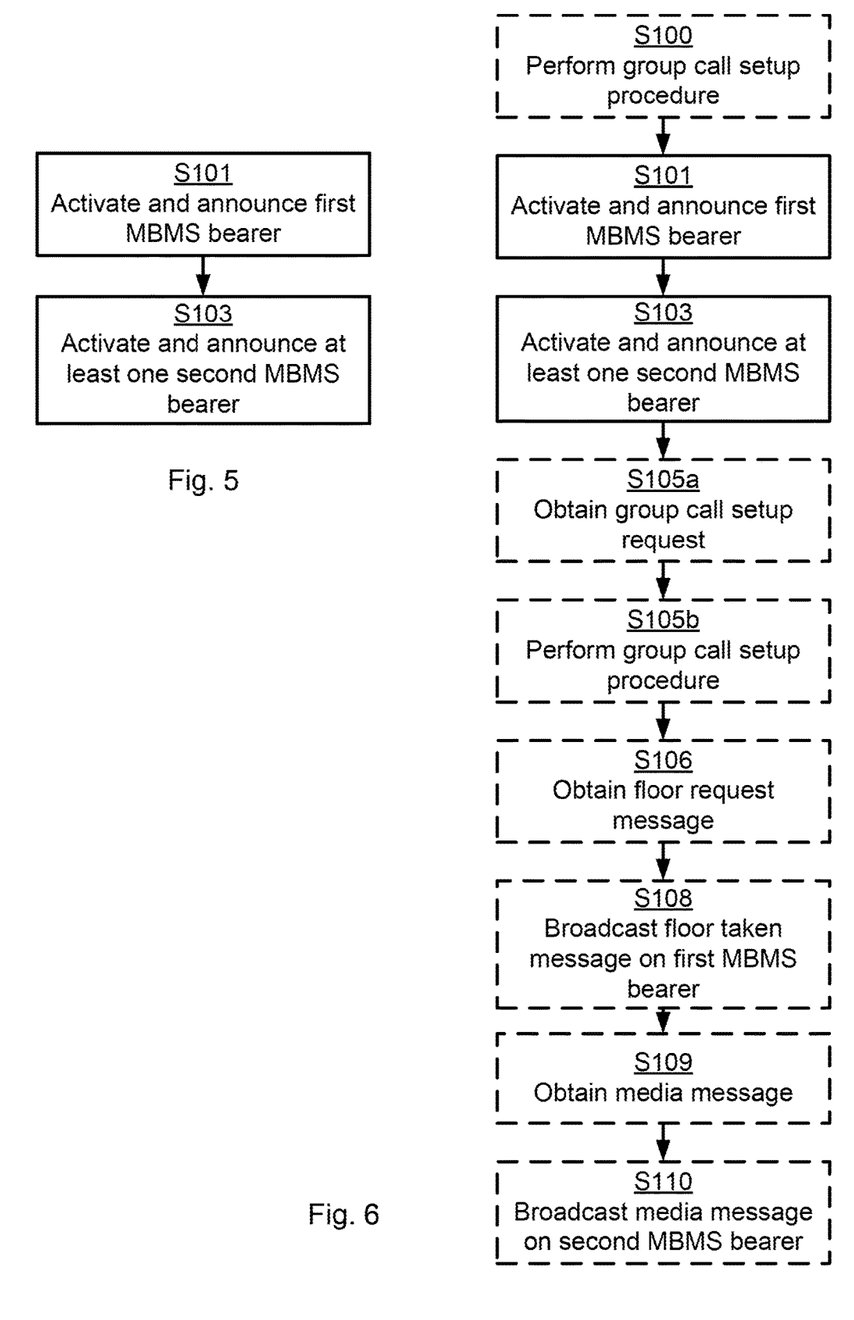
FIGS. 5, 6, 7, and 8 are flowcharts of methods according to embodiments.
Figures 7, 8:
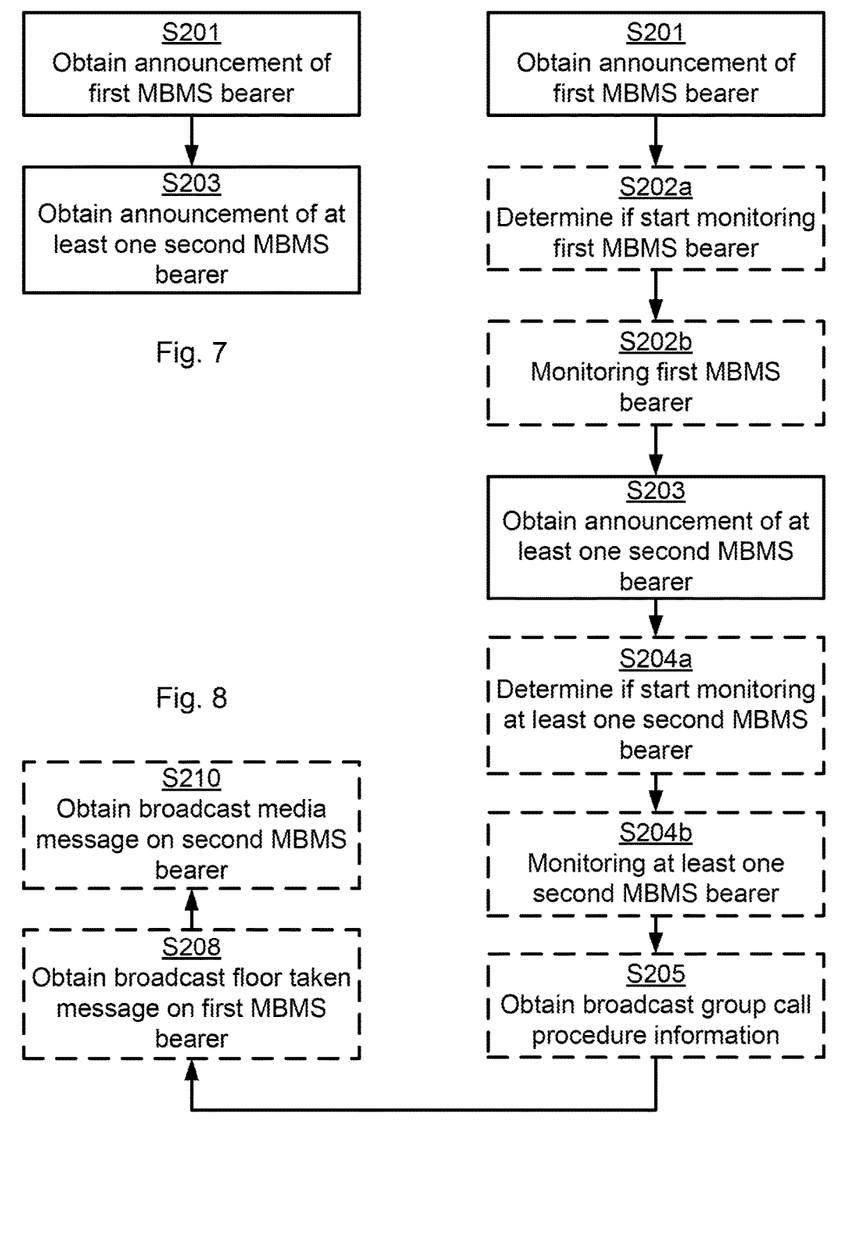

FIGS. 5 and 6 are flow charts illustrating embodiments of methods for MBMS bearer handling in a group communications system as performed by the control node 200. FIGS. 7 and 8 are flow charts illustrating embodiments of methods for MBMS bearer handling in a group communications system as performed by the client node 300a, 300b. The methods are advantageously provided as computer programs 420a, 420b.

Reference is now made to FIG. 5 illustrating a method for MBMS bearer handling in a group communications system as performed by the control node 200 according to an embodiment.

The control node 200 is configured to, in a step S101, activate and announce a first MBMS bearer for supporting floor control in a group call to client nodes 300a, 300b of the group call. In this respect the activate module 210a and the announce module 210b may comprise instructions that when executed by the control node 200 causes the processing circuitry 210, possibly in conjunction with the communications interface 220 and the storage medium 230, to activate and announce the first MBMS bearer in order for the control node 200 to perform step S101.

The control node 200 is further configured to, in a step S103, activate and announce at least one second MBMS bearer for supporting media transmission in the group call. In this respect the activate module 210a and the announce module 210b may comprise instructions that when executed by the control node 200 causes the processing circuitry 210, possibly in conjunction with the communications interface 220 and the storage medium 230, to activate and announce the at least one second MBMS bearer in order for the control node 200 to perform step S103.

The floor control and the media transmission are thereby supported on separate MBMS bearers for the group call. Hence, at least two MBMS bearers are used; one MBMS bearer for floor control signaling and one or more MBMS bearers for transmission of the media. This enables the floor control signaling and the media signaling to be split onto different bearers.

Embodiments relating to further details of MBMS bearer handling in a group communications system as performed by the control node 200 will now be disclosed. Reference is now made to FIG. 6 illustrating methods for MBMS bearer handling in a group communications system as performed by the control node 200 according to further embodiments.

According to an embodiment the control node 200 is configured to, in a step S105a, obtain a group call setup request from a first client node 300a, and in response thereto, in a step S105b, perform a group call setup procedure for the group call. Hence, according to this embodiment the group call setup procedure is performed in response to the group call setup request having been obtained. The group call setup request is obtain in response to the control node 200 having activated the first MBMS bearer and the at least one second MBMS bearer (i.e., in response to having performed step S103).

According to another embodiment the control node 200 is configured to, in a step S100, perform the group call setup procedure for the group call prior to having activated and announced the first MBMS bearer, as in step S101.

In this respect, one group call may only be announced (and broadcasted) on one second MBMS bearer. The reason that there might be several MBMS bearer for media (i.e., at least two second MBMS bearers), is to be able to handle several group calls.

As will be further disclosed below, a client node 300a, denoted a first client node, may provide a floor request message to the control node 200. Hence, according to an embodiment the control node 200 is configured to, in a step S106, obtain a floor request message for the group call from a first client node 300a of the client nodes 300a, 300b. The control node 200 may then, in response thereto, broadcast (in a step S108) a floor taken message for the group call on the first MBMS bearer to at least one other client node 300b of the client nodes 300a, 300b. The control node 200 may further provide (in a step S107) a floor grant message to the first client node 300a.

Once the floor has been granted to the first client node 300a, the first client node 300a may start sending media messages. Hence, according to an embodiment the control node 200 is configured to, in a step S109, obtain media messages for the group call from the first client node 300a. The control node 200 may then, in response thereto, broadcast (in a step S110) the media messages for the group call on one of the at least one second MBMS bearer to at least one other client node 300b of the client nodes 300a, 300b.

Reference is now made to FIG. 7 illustrating a method for MBMS bearer handling in a group communications system as performed by the client node 300b according to an embodiment.

As noted above, the control node in step S101 activates and announces a first MBMS bearer. This announcement is assumed to be received by the client node 300a. The client node 300b is thus configured to, in a step S201, obtain a broadcast service announcement of a first MBMS bearer for supporting floor control in a group call from a control node 200 of the group call. In this respect the obtain module 310a may comprise instructions that when executed by the client node 300b causes the processing circuitry to, possibly in conjunction with the communications interface 320 and the storage medium 330 to, obtain the broadcast service announcement of the first MBMS bearer in order for the client node 300b to perform step S201.

As noted above, the control node in step S103 activates and announces at least one second MBMS bearer. This announcement is assumed to be received by the client node 300a. The client node 300b is thus configured to, in a step S203, obtain a broadcast service announcement of at least one second MBMS bearer for supporting media transmission in the group call from the control node. In this respect the obtain module 310a may comprise instructions that when executed by the client node 300b causes the processing circuitry to, possibly in conjunction with the communications interface 320 and the storage medium 330 to, obtain the broadcast service announcement of the at least one second MBMS bearer in order for the client node 300b to perform step S203.

As noted above, the floor control and the media transmission are thereby supported on separate MBMS bearers for the group call.

Embodiments relating to further details of MBMS bearer handling in a group communications system as performed by the client node 300b will now be disclosed.

Reference is now made to FIG. 8 illustrating methods for MBMS bearer handling in a group communications system as performed by the client node 300b according to further embodiments.

The client node 300b may, upon reception of the broadcast service announcement of the first MBMS bearer determine if the client node 300b is to monitor the first MBMS bearer for floor control messages. Hence, according to an embodiment the client node 300b is configured to, in a step S202a, determine whether to start monitoring the first MBMS bearer for floor control messages or not in response to having obtained the broadcast service announcement of the first MBMS bearer. Indeed, the client node 300b may be configured to, in a step S202b, monitor the first MBMS bearer for floor control messages.

The client node 300b may, upon reception of the broadcast service announcement of the at least one second MBMS bearer determine if the client node 300b is to monitor one of the at least one second MBMS bearer for media messages. Hence, according to an embodiment the client node 300b is configured to, in a step S204a, determine whether to start monitoring one of the at least one second MBMS bearer for media messages or not in response to having obtained the broadcast service announcement of the at least one second MBMS bearer. Indeed, the client node 300b may be configured to, in a step S204b, monitor one of the at least one second MBMS bearer for media messages.

As noted above, the control node 200 may broadcast (in step S108) a floor taken message for the group call on the first MBMS bearer in response to having received a floor request message from a first client node 300a. Hence, the client node 300b may be configured to, in a step S208, obtain a floor taken message for the group call on the first MBMS bearer from the control node 200.

As noted above, the control node 200 may broadcast (in step S110) media messages received from the first client node 300a. Hence, the client node 300b may be configured to, in a step S210, obtain media messages for the group call on one of the at least one second MBMS bearer from the control node 200.

The two (or more) MBMS bearers can be configured with different modulation and coding schemes (MCSs). That is, according to an embodiment the modulation and coding scheme for the first MBMS bearer and the modulation and coding scheme for at least one second MBMS bearer differ. The MBMS bearer for floor control may be configured with a robust MCS in order to achieve a high QoS for the floor control signaling. Furthermore the MBMS bearer used for media can use a less robust MCS which leads to a more efficient use of the radio resources. Hence, according to an embodiment the modulation and coding scheme for the first MBMS bearer is more robust than the modulation and coding scheme for the at least one second MBMS bearer.

The first bearer and the at least one second bearer may thereby have different QoS. This may enable efficient resource utilization and less data that the client nodes 300a, 300b need to receive and may hence reduce power consumption of the devices in which the client nodes 300a, 300b reside.

Figure 9:
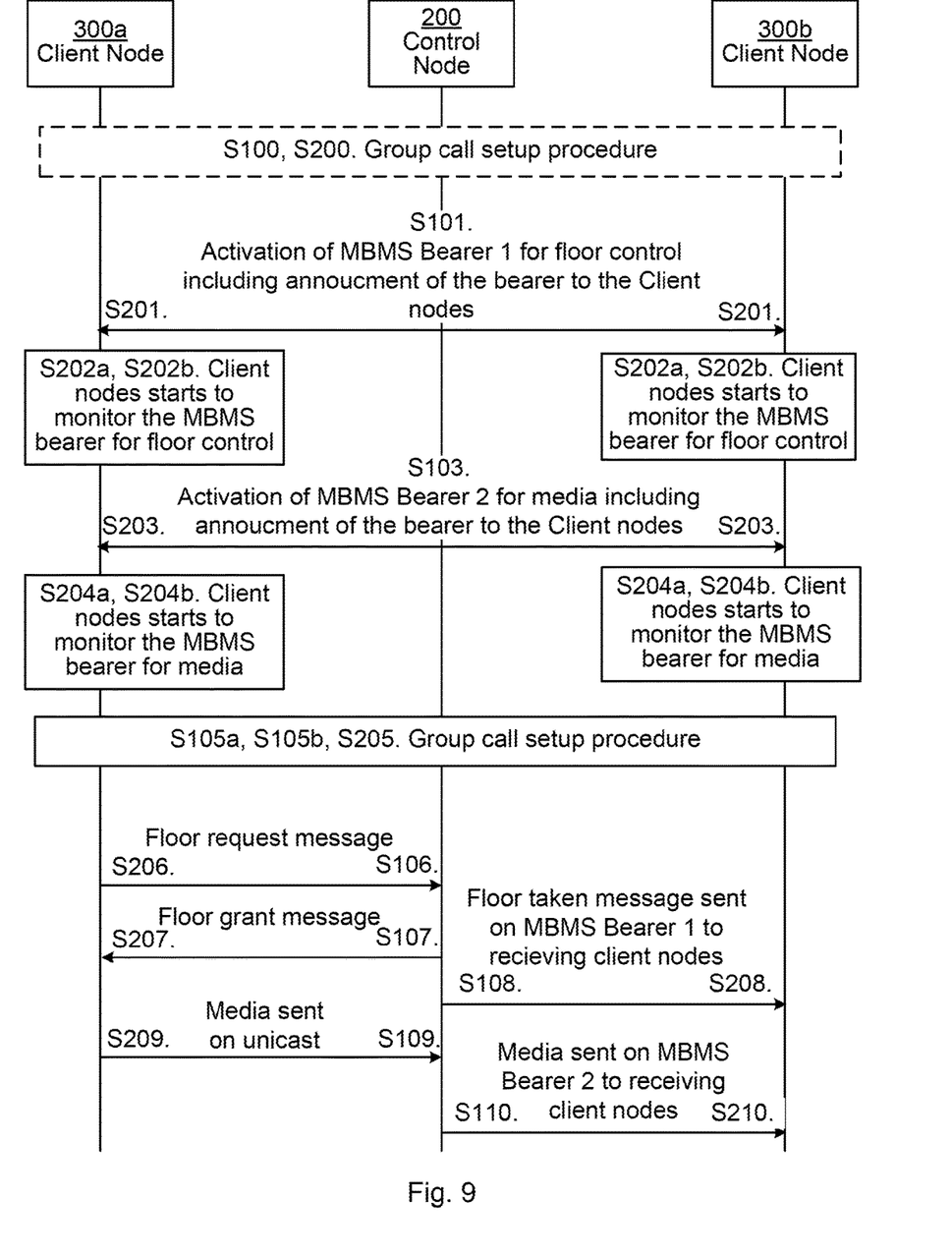
FIGS. 9 and 10 are signalling diagrams according to embodiments.

A first particular embodiment for MBMS bearer handling in a group communications system based on at least some of the above disclosed embodiments will now be disclosed in detail with reference to the signalling diagram of FIG. 9. Parallel references are continued to FIGS. 1-8.

This particular embodiment is concerns a group communication system (such as a PTT system) that comprises a group communications server, as represented by the herein disclosed control node 200, which includes a floor arbitrator function, and a cellular network supporting both unicast and broadcast based transmission and client nodes 300a, 300b which may be installed on wireless devices 150a, 150b.

Steps S100, S200: According to an alternative embodiment, a group call setup procedure performed. However, as will be disclosed below, the actions performed in step S100 may instead be performed in step S105b.

Steps S101, S201: The control node 200 activates a first MBMS bearer in the network and also announces this bearer to the client nodes 300a, 300bs. This bearer is used for floor control signaling and is therefore using a QoS with robust coding and modulation to minimize packet loss.

Step 202: The client nodes 300a, 300bs determine if they are interested in monitoring the activated bearer (from step S101, S201) and in such case starts to listen to the floor control signaling.

Steps S103, S203: The control node 200 activates at least one second MBMS bearer in the network and also announce this at least one bearer to the client nodes 300a, 300bs. This at least one bearer is used for the media that is broadcasted. The QoS on this at least one bearer is typically not as high as for the floor control bearer. A low level of packet loss might be acceptable.

Step S204: The client nodes 300a, 300bs determine if they are interested in monitoring the at least one activated bearer (from step S103, S203) and in such case prepare to listen for any media on this the at least one activated bearer.

Steps S105a, S105b, S205: A group call setup procedure is performed. The group call setup procedure is initiated by a first client node 300a (acting as a transmitting client) requesting the group call and the control node 200 performing a group call setup procedure for the group call in response to having obtained the request from the first client node 300a. In an alternative embodiment the group call setup procedure is instead performed in step S100, i.e., prior to the first MBMS bearer having been activated and announced.

Steps S106, S206: The first client node 300a requests the floor from the control node 200.

Steps S107, S207: The control node 200 grants the first client node 300a the right to the floor.

Steps S108, S208: The control node 200 also sends a floor taken message to at least one second client node 300b (acting as receiving clients) on the MBMS bearer dedicated for floor control.

Steps S109, S209: The first client node 300a provides media to the control node 200 using unicast signalling.

Steps S110, S210: The control node 200 provides the received media to the at least one second client node 300b on the at least one MBMS bearer dedicated for media.

Figure 10:
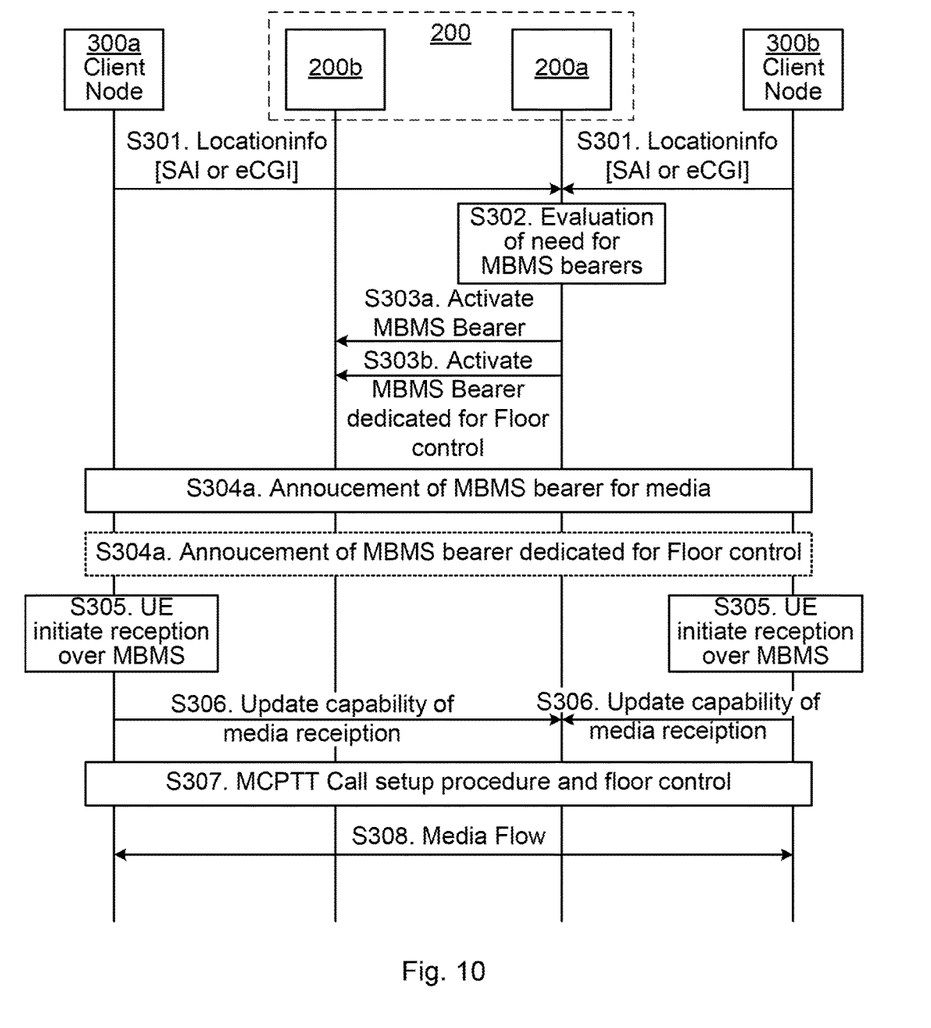

A second particular embodiment for MBMS bearer handling in a group communications system based on at least some of the above disclosed embodiments will now be disclosed in detail with reference to the signalling diagram of FIG. 10. Parallel references are continued to FIGS. 1-8.

This particular embodiment is concerns a group communication system (such as a PTT system) that comprises a group communications server 200a and a Broadcast Multicast Service Center (BMSC) 200b, as represented by the herein disclosed control node 200, which includes a floor arbitrator function, and a cellular network supporting both unicast and broadcast based transmission and client nodes 300a, 300b which may be installed on wireless devices 150a, 150b.

S301. Client nodes 300a, 300b will, based on the location of the respective client node 300a, 300b, update profile report its location to the group communications server 200a. This information may include but is not limited to the eCGI (E-UTRAN Cell Global Identifier, where E-UTRAN is short for Evolved Universal Terrestrial Access Network) or a list of SAIs (service Area Identifiers) or both.

S302. The group communications server 200a evaluates if there is a need for using an MBMS bearer for group calls. The evaluation may be based on the user location information received in step S301. The procedure for this may be application implementation specific.

S303a. The group communications server 200a activates an MBMS bearer. The activation of the MBMS bearer is done on MB2-C reference point and according to TS 23.468 sub clause 5.1.2.3.2. The activation message may include TMGI (Temporary Mobile Group Identity), QoS (Quality of service), MBMS broadcast area, start time. This bearer will be used for the media.

S303b. The group communications server 200a also activates an MBMS bearer dedicated for floor control signalling. The activation of the MBMS bearer is done on MB2-C reference point and according to TS 23.468 sub clause 5.1.2.3.2. The activation message may include TMGI, QoS, MBMS broadcast area, start time. This bearer will be used for the MCPTT floor control signalling.

The procedure for setting up an MBMS bearer is specified in 3GPP TS 23.246 v13.1.0. The process starts in the BMSC 200b and may be activated via the MB2 reference point defined in 3GPP TS 29.468 v12.3.0.

S304a. The group communications server 200a sends an MBMS bearer announcement message to the client nodes 300a, 300b. The service announcement procedure is be based on any of the defined procedures in TS 26.346 sub clause 5.2.

S304b. The group communications server 200a may send an MBMS bearer announcement message for the floor control bearer to the client nodes 300a, 300b. The service announcement procedure is based on any of the defined procedures in TS 26.346 sub clause 5.2.

S305. The client nodes 300a, 300b initiate reception of group call media over the MBMS bearer buy acquiring information from SIB2, SIB13 (system information blocks 2 and 13) and MCCH (multicast control channel) by using the identifier of the MBMS bearer (i.e., TMGI) received in step S304a and optionally step S304b.

S306. The client nodes 300a, 300b provides the group communications server 200a with capability information relating to how the respective client nodes 300a, 300b are enabled to receive group call media, including floor control, over the MBMS bearer.

S307. A first client node 300a sends a group call setup messages including floor request message to the group communications server 200a over a unicast bearer. If the floor is available, the group communications server 200a will grant the floor by sending a floor grant message to the first client node 300a. Furthermore the group communications server 200a sends a floor taken message on the MBMS bearer to any receiving client nodes, as here represented by client node 300b, that has notified the capability of receiving the media over an MBMS bearer.

S308. The first client node 300a sends a media flow to the group communications server 200a on a unicast bearer and the group communications server 200a sends the media on a MBMS bearer to the receiving clients 300b.

The proposed solutions have mainly been described above with reference to a few embodiments. However, as is readily appreciated by a person skilled in the art, other embodiments than the ones disclosed above are equally possible within the scope of the disclosure, as shown by the appended list of enumerated embodiments.

The invention claimed is:

1. A method for multimedia broadcast multicast service (MBMS) bearer handling in a group communications system, the method being performed by a control node, comprising:
    obtaining location information;
    evaluating a need for one or more MBMS bearers for a group call based on the location information;
    activating and announcing a first MBMS bearer for supporting floor control in the group call to client nodes of the group call; and
    activating and announcing at least one second MBMS bearer for supporting media transmission in the group call,
    whereby the floor control and the media transmission are supported on separate MBMS bearers for the group call.

2. The method according to claim 1, further comprising:
    obtaining a group call setup request from a first client node of the client nodes in response to having activated the first MBMS bearer and one of the at least one second MBMS bearer; and
    performing a group call setup procedure for the group call.

3. The method according to claim 2, wherein said group call setup procedure is performed in response to the group call setup request having been obtained.

4. The method according to claim 2, wherein said group call setup procedure is performed prior to activating and announcing said first MBMS bearer.

5. The method according to claim 1, further comprising:
    obtaining a floor request message for the group call from a first client node of the client nodes; and in response thereto:
    broadcasting a floor taken message for the group call on the first MBMS bearer to at least one other client node of the client nodes.

6. The method according to claim 1, further comprising:
    obtaining media messages for the group call from a first client node of the client nodes; and in response thereto:
    broadcasting the media messages for the group call on one of the at least one second MBMS bearer to at least one other client node of the client nodes.

7. A method for multimedia broadcast multicast service (MBMS) bearer handling in a group communications system, the method being performed by a client node, comprising:
    providing location information to a control node;
    obtaining a broadcast service announcement of a first MBMS bearer for supporting floor control in a group call from the control node of the group call; and
    obtaining a broadcast service announcement of at least one second MBMS bearer for supporting media transmission in the group call from the control node,
    whereby the floor control and the media transmission are supported on separate MBMS bearers for the group call and whereby one or more of the separate MBMS bearers of the group call was activated by the control node upon evaluating a need for one or more MBMS bearers for the group call based on the location information.

8. The method according to claim 7, further comprising:
    determining whether to start monitoring the first MBMS bearer for floor control messages or not in response to having obtained the broadcast service announcement of the first MBMS bearer.

9. The method according to claim 7, further comprising:
    monitoring the first MBMS bearer for floor control messages.

10. The method according to claim 7, further comprising:
    determining whether to start monitoring one of the at least one second MBMS bearer for media messages or not in response to having obtained the broadcast service announcement of the at least one second MBMS bearer.

11. The method according to claim 7, further comprising:
    monitoring one of the at least one second MBMS bearer for media messages.

12. The method according to claim 7, further comprising:
    obtaining a floor taken message for the group call on the first MBMS bearer from the control node.

13. The method according to claim 7, further comprising:
    obtaining media messages for the group call on one of the at least one second MBMS bearer from the control node.

14. The method according to claim 7, wherein modulation and coding scheme for the first MBMS bearer and the modulation and coding scheme for at least one second MBMS bearer differ.

15. The method according to claim 14, wherein the modulation and coding scheme for the first MBMS bearer is more robust than the modulation and coding scheme for the at least one second MBMS bearer.

16. The method according to claim 7, wherein the group communications system is a push to talk (PTT) system.

17. A control node for multimedia broadcast multicast service (MBMS) bearer handling in a group communications system, the control node comprising processing circuitry and a communications interface, the control node configured to:
    obtain location information;
    evaluate a need for one or more MBMS bearers for a group call based on the location information;
    activate and announce a first MBMS bearer for supporting floor control in the group call to client nodes of the group call; and
    activate and announce at least one second MBMS bearer for supporting media transmission in the group call,
    whereby the floor control and the media transmission are supported on separate MBMS bearers for the group call.

18. The control node according to claim 17, further comprising a storage medium storing a set of operations, and wherein the processing circuitry is configured to retrieve the set of operations from the storage medium to cause the control node to perform the set of operations.

19. A client node for multimedia broadcast multicast service (MBMS) bearer handling in a group communications system, the client node comprising processing circuitry and a communications interface, the client node configured to:
provide location information to a control node;
obtain a broadcast service announcement of a first MBMS bearer for supporting floor control in a group call from the control node of the group call; and
obtain a broadcast service announcement of at least one second MBMS bearer for supporting media transmission in the group call from the control node,
whereby the floor control and the media transmission are supported on separate MBMS bearers for the group call and whereby one or more of the separate MBMS bearers of the group call was activated by the control node upon evaluating a need for one or more MBMS bearers for the group call based on the location information.

20. The client node according to claim 19, further comprising a storage medium storing a set of operations, and wherein the processing circuitry is configured to retrieve the set of operations from the storage medium to cause the client node to perform the set of operations.

* * * * *

UNITED STATES PATENT AND TRADEMARK OFFICE
CERTIFICATE OF CORRECTION

PATENT NO. : 10,051,440 B2
APPLICATION NO. : 15/083436
DATED : August 14, 2018
INVENTOR(S) : Åkesson et al.

Page 1 of 2

It is certified that error appears in the above-identified patent and that said Letters Patent is hereby corrected as shown below:

On the Title Page

In Figure, delete " 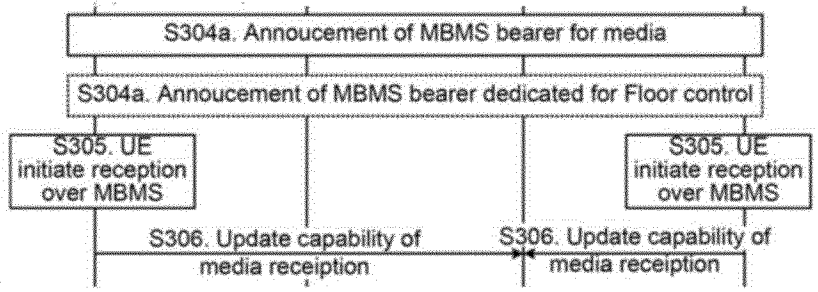 " and insert -- 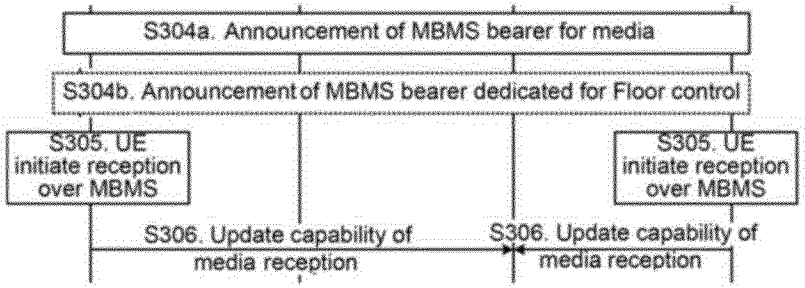 --, therefor.

Signed and Sealed this
Eleventh Day of December, 2018

Andrei Iancu
*Director of the United States Patent and Trademark Office*

CERTIFICATE OF CORRECTION (continued)
U.S. Pat. No. 10,051,440 B2

In the Drawings

In Fig. 10, Sheet 6 of 6, delete "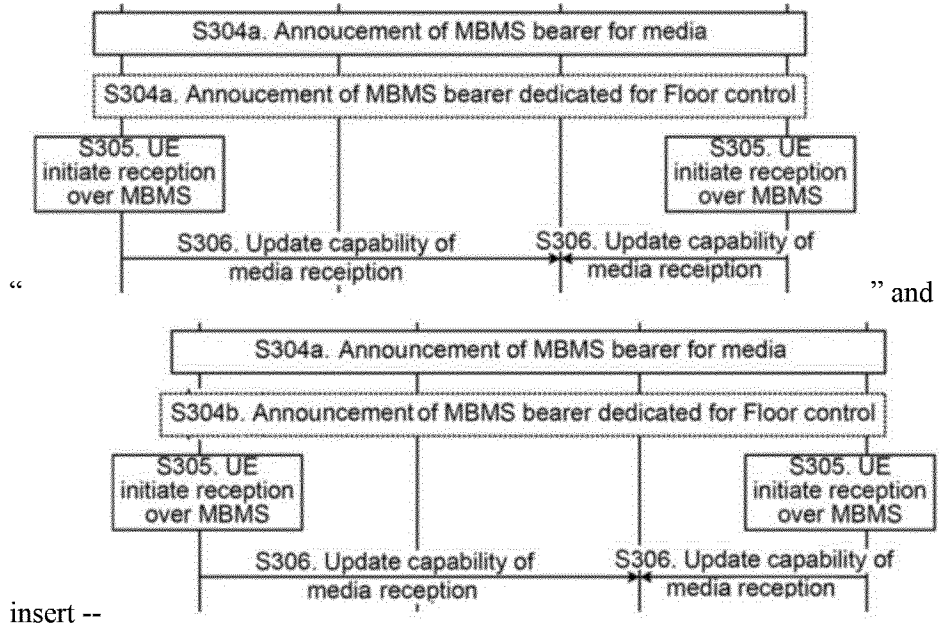" and
insert -- -- , therefor.

In the Specification

In Column 1, Lines 24-25, delete "Multicast-Broadcast Multimedia Services (MBMS)" and insert -- Multimedia-Broadcast Multicast Services (MBMS) --, therefor.

In Column 6, Line 3, delete "to from" and insert -- to form --, therefor.

In Column 7, Line 37, delete "to from" and insert -- to form --, therefor.

In Column 11, Line 25, delete "300bs." and insert -- 300b. --, therefor.

In Column 11, Line 28, delete "300bs" and insert -- 300b --, therefor.

In Column 11, Line 34, delete "300bs." and insert -- 300b. --, therefor.

In Column 11, Line 39, delete "300bs" and insert -- 300b --, therefor.

In Column 12, Line 18, delete "Terrestrial" and insert -- Terrestrial Radio --, therefor.